No. 667,171.  
C. CHRISTENSEN.  
BICYCLE.  
(Application filed Aug. 20, 1900.)  
Patented Jan. 29, 1901.
(No Model.)
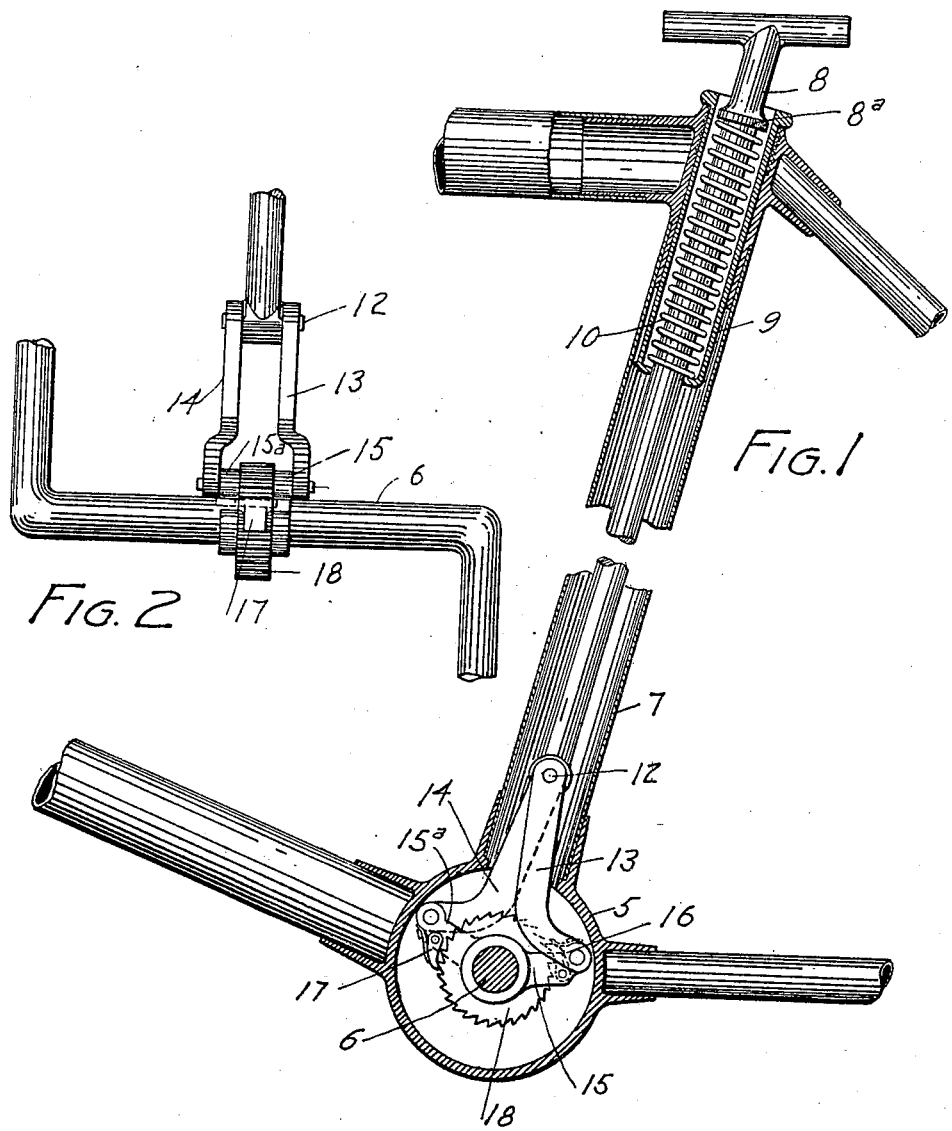
WITNESSES:
INVENTOR.  
Christian Christensen.  
BY  
ATTORNEY.

UNITED STATES PATENT OFFICE.

CHRISTIAN CHRISTENSEN, OF DENVER, COLORADO.

BICYCLE.

SPECIFICATION forming part of Letters Patent No. 667,171, dated January 29, 1901.

Application filed August 20, 1900. Serial No. 27,407. (No model.)

*To all whom it may concern:*

Be it known that I, CHRISTIAN CHRISTENSEN, a citizen of the United States of America, residing at Denver, in the county of Arapahoe and State of Colorado, have invented certain new and useful Improvements in Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in bicycles, my object being to lessen or overcome the difficulties of propelling machines of this class while passing over rough or uneven surfaces; and to this end the invention consists of the features, arrangements, and combinations hereinafter described and claimed, all of which will be fully understood by reference to the accompanying drawings, in which is illustrated an embodiment thereof.

In the drawings, Figure 1 is a section taken through the rear frame-bar, the center bearing, and the crank-shaft of a bicycle equipped with my improvements. Fig. 2 is a detail view of the crank-shaft shown in connection with my improvements.

The same reference characters indicate the same parts in both views.

Let the numeral 5 designate the center bearing, 6 the crank-shaft, and 7 the tubular frame-bar, extending upwardly from the center bearing. In the top of the tube 7 is inserted a case 9, containing a coil-spring 10, whose lower extremity rests on the bottom of the case. The upper extremity of the spring 10 is engaged by a collar 8ª, formed on the saddle-post 8, which extends downwardly through the bottom of the case 9. The lower extremity of the saddle-post is pivotally connected, as shown at 12, with the upper extremities of two links 13 and 14, whose lower extremities are respectively connected with two arms 15 and 15ª, loosely mounted on the crank-shaft and projecting in opposite directions. To the extremities of the arms 15 and 15ª are pivotally connected two spring-held dogs 16 and 17, adapted to engage a ratchet-wheel 18, fast on the crank-shaft 6. The two dogs 16 and 17 engage the ratchet-wheel on opposite sides, one projecting upwardly and the other downwardly. As the seat-post moves downwardly in response to the weight of the rider both links 13 and 14 are given a corresponding movement. Hence the dog 17, acting on the ratchet-wheel 18, aids in rotating the shaft 6, while the dog 16 moves downwardly one or more teeth on the wheel. Again, as the saddle-post moves upwardly the dog 16 acts to aid the rotation of the crank-shaft, while the dog 17 moves upwardly to a corresponding extent on the wheel. This operation is repeated every time the saddle-post moves down and up in the tubular frame-bar 7, thus assisting the rider and neutralizing the difficulties incident to propelling the ordinary bicycle over rough or uneven surfaces.

Having thus described my invention, what I claim is—

In a bicycle or similar machine the combination with a crank-shaft, the center bearing and the rear frame-bar connected with said bearing and open at its lower extremity, of a saddle-post located in the frame-bar, a spring surrounding the saddle-post within the frame-bar, its lower extremity engaging a stop on the bar, while its upper extremity engages a stop on the post which projects below the spring, a ratchet-wheel fast on the crank-shaft, two arms loosely mounted on the crank-shaft and projecting in different directions, two links whose upper extremities are connected with the lower extremity of the saddle-post, and whose lower extremities are respectively connected with the arms of the crank-shaft, and dogs respectively mounted on the arms of the crank-shaft, one dog projecting upwardly and the other downwardly, and arranged to engage the ratchet-wheel on opposite sides, one acting to turn the wheel as the seat-post moves upwardly and the other to perform the same function when the seat-post moves downwardly, the links, the ratchet-wheel, the arms and the dogs carried thereby, being concealed within the center bearing and the lower part of the frame.

In testimony whereof I affix my signature in presence of two witnesses.

CHRISTIAN CHRISTENSEN.

Witnesses:
A. J. O'BRIEN,
DORA C. SHICK.